United States Patent

Blanchet

[11] Patent Number: 5,857,326
[45] Date of Patent: Jan. 12, 1999

[54] EXHAUST POISON TRAP

[75] Inventor: Scott Christopher Blanchet, Imlay City, Mich.

[73] Assignee: General Motors Corporation, Detroit, Mich.

[21] Appl. No.: 977,674

[22] Filed: Nov. 24, 1997

[51] Int. Cl.$^6$ .............................. F01N 3/02; F01N 3/20; B01D 45/12

[52] U.S. Cl. ................. 60/297; 55/457; 55/DIG. 30; 60/302; 60/311

[58] Field of Search .............................. 60/297, 302, 311, 60/323; 55/399, 447, 456, 457, DIG. 30

[56] References Cited

U.S. PATENT DOCUMENTS

| | | | |
|---|---|---|---|
| 3,633,343 | 1/1972 | Mark | 55/316 |
| 3,694,325 | 9/1972 | Katz et al. | 205/75 |
| 3,813,854 | 6/1974 | Hortman | 55/457 X |
| 3,966,443 | 6/1976 | Okano et al. | 60/311 X |
| 5,016,437 | 5/1991 | Huether et al. | 60/311 X |
| 5,497,619 | 3/1996 | Yamada et al. | 60/279 |
| 5,546,748 | 8/1996 | Iwai et al. | 60/302 |
| 5,562,510 | 10/1996 | Suzuki et al. | 440/89 |
| 5,648,050 | 7/1997 | Matsumoto et al. | 422/180 |

FOREIGN PATENT DOCUMENTS

| | | |
|---|---|---|
| 97/30797 | 8/1997 | WIPO . |
| 97/31738 | 9/1997 | WIPO . |
| 97/32119 | 9/1997 | WIPO . |

*Primary Examiner*—Tony M. Argenbright
*Attorney, Agent, or Firm*—Anthony Luke Simon

[57] ABSTRACT

An exhaust poison trap for protection of catalytic converters in automotive exhaust systems includes a tubular housing having open ends and a peripheral wall internally defining an exhaust chamber, a helical wall longitudinally dividing the exhaust chamber into at least two longitudinally extending helical passages for exhaust gas flow and porous means substantially covering the interior of the peripheral wall and forming an outer periphery of each of said helical passages, whereby exhaust gas passing through the exhaust chamber is directed in a helical path through the helical passages, causing particulate matter in the gas to be accelerated outwardly by centrifugal force and trapped in the porous means, thus protecting a downstream catalytic converter from trapped catalyst poisoning particles such as zinc and phosphorous. The porous means may be coated to improve trapping or to aid catalytic reactions in the exhaust gases.

8 Claims, 2 Drawing Sheets

EXHAUST POISON TRAP

TECHNICAL FIELD

This invention relates to exhaust poison traps for protection of catalytic converters in automotive exhaust systems.

BACKGROUND

Automotive emissions control is a mature industry. Automakers and suppliers have been challenged to control and reduce vehicle tailpipe emissions by the U.S. Clean Air Act in 1965 and subsequent legislation in other countries. Although base engine emissions of controlled exhaust products have been reduced significantly over the past thirty years, compliance with periodically decreasing tailpipe limits has been made possible through the use of catalytic converters.

A catalytic converter helps complete the combustion of hydrocarbon (HC) and carbon monoxide (CO) emissions and may also reduce $NO_x$ emissions. It was discovered early in their development that the lead additive in leaded gasoline acted to poison the catalyst, making its effective life only a few thousand miles. For this reason, countries with strict emission regulations also require the use of unleaded gasoline in automotive vehicles to prevent damage to their catalytic converters. However, some countries have begun regulating vehicle emissions before an adequate infrastructure is in place to provide unleaded fuel. Vehicles used in these countries would significantly benefit from use of an exhaust aftertreatment system that is resistant to lead poisoning.

Another obstacle to the durability of low emission catalyst systems is degradation in performance due to engine oil poison deposition. Trace amounts of zinc, phosphorus and other elements are put in engine oil as anti-wear additives. Their purpose is to protect engine parts from excessive wear during start-up, when engine oil is not coating the metal components of the engine. However, as the engine burns oil, zinc and phosphorus are exhausted through the catalytic converter, which may accelerate degradation of the catalyst's activity. Although the antiwear additives could be removed from the oil, long term durability of the engine could suffer. Low emission vehicles could benefit from exhaust aftertreatment systems with a tolerance for engine oil poisons.

SUMMARY OF THE INVENTION

Advantageously, the present invention provides for use in engine exhaust systems of an exhaust poison trap to be located in the exhaust gas stream ahead of a catalytic converter. A particular embodiment provides an exhaust poison trap for protection of catalytic converters in automotive exhaust systems including a tubular housing having open ends and a peripheral wall internally defining an exhaust chamber. A helical wall longitudinally divides the exhaust chamber into at least two longitudinally extending helical passages for exhaust gas flow and porous means substantially cover the interior of the peripheral wall and form an outer periphery of each of the helical passages. Exhaust gas passing through the exhaust chamber is directed in a helical path through the helical passages, causing particulate matter in the gas to be accelerated outwardly by centrifugal force and trapped in the porous means, thus protecting a downstream catalytic converter from trapped catalyst poisoning particles such as lead, zinc and phosphorous. The porous means may be coated to improve trapping or to aid catalytic reactions in the exhaust gases.

These and other features and advantages of the invention will be more fully understood from the following description of certain specific embodiments of the invention taken together with the accompanying drawings.

BRIEF DESCRIPTION OF THE DRAWINGS

The present invention will now be described by way of example with reference to the following drawings in which.

DETAILED DESCRIPTION OF THE DRAWINGS

Figure 1:
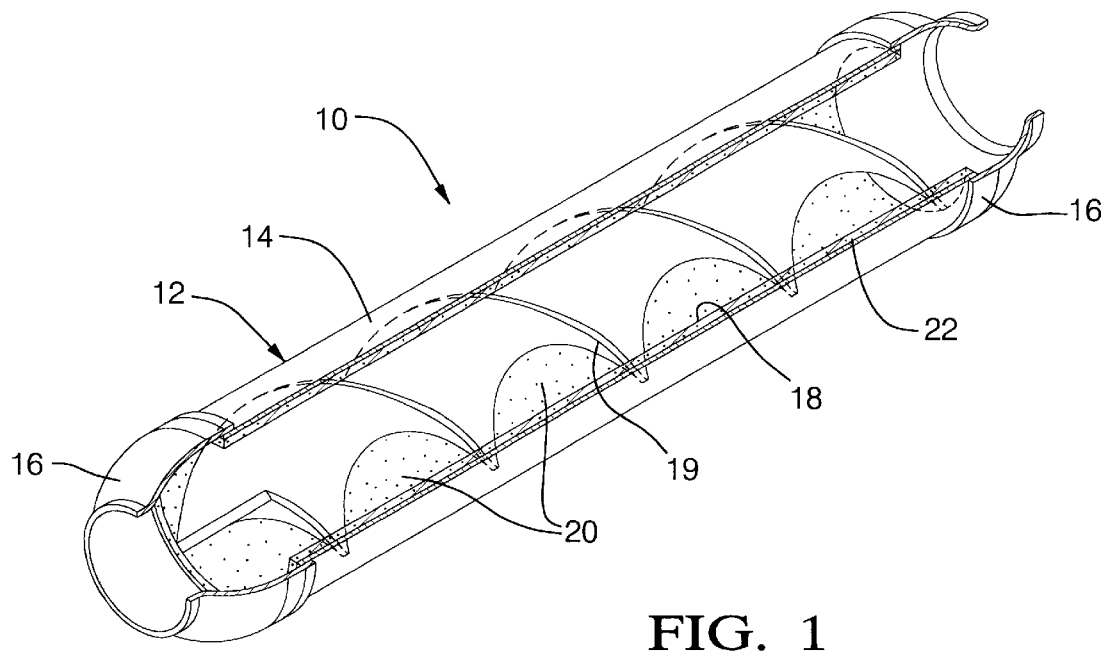
FIG. 1 is a pictorial view of an example exhaust poison trap with portions broken away to show the interior construction.

Referring now to the drawings in detail, numeral 10 generally indicates an exemplary embodiment of an exhaust poison trap according to the invention. Trap 10 includes a tubular housing 12 made of any suitable high temperature resistant material such as stainless steel. The housing 12 includes a generally cylindrical main section defined by a peripheral wall 14 connecting at both ends with a reduced diameter end section 16. The end sections 14 have generally cylindrical or slightly flared connecting portions for receiving a tapered or straight end of an associated exhaust pipe, not shown. Optionally, the end sections could be made with flanges or with any other desired fittings to connect with other types of exhaust connections.

The peripheral wall 14 of the main section of the housing defines an exhaust chamber 18 through which a helical wall 19 extends longitudinally, dividing the chamber 18 into two longitudinal helical passages 20 of semi-circular cross section. Preferably, the wall 19 is made thin to have a low thermal inertia and avoid excessive cooling of exhaust gases during warm-up. However, the wall 19 must be stable enough to avoid damage from the exhaust temperatures. If desired, the wall 19 could have additional arms separating the chamber 18 into three or more helical passages 20.

Figure 2:
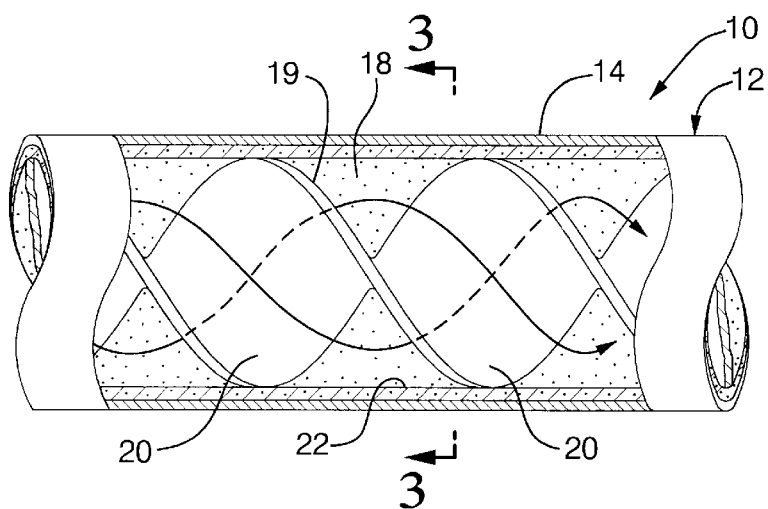
FIG. 2 is a side view of the trap of FIG. 1 broken away to show the interior of the trap.
Figure 3:
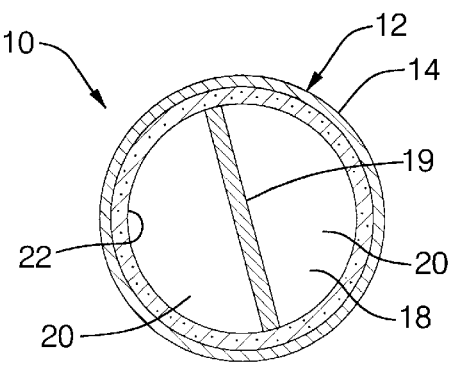
FIG. 3 is a transverse cross-sectional view from the line 3—3 of FIG. 2.

The interior of the peripheral wall 14 is fully or substantially covered by porous means 22 which act as a trap for particulate matter. The porous means may be of any suitable form such as a perforated inner pipe spaced closely inward from the wall 14 and supported by means such as ribs or a wire mat. However, in FIGS. 1–3, the porous means 22 is in the form of a mat-like inner sheath of porous material covering the interior of the housing wall 14. The porous material may be crushed wire or a foam-like product of a known type able to withstand the high exhaust temperatures to which it will be exposed during operation. Optionally, the porous means 22 may be coated with a catalytic material to provide some degree of initial emission control in the exhaust system. Other suitable coatings could be used to increase the roughness or surface condition of the porous material to increase the particulate trapping effectiveness of the trap.

In operation, the poison trap 10 is connected in a vehicle exhaust system upstream of a catalytic converter. Exhaust gas passing through the trap is directed in a helical path through the helical passages 20. Centrifugal force acting on the helically flowing gases causes particulates, including catalyst poisons such as lead, zinc and phosphorous, to be thrown outward into the porous sheath or other means 22 where the particulates are trapped. These poisons are thus prevented from reaching the catalytic converter so that the life of the catalyst is thereby extended. If a suitable reactive coating is provided on the sheath or means 22, gas phase poisons could also be scrubbed out of the exhaust gas by the highly convective flow created in the trap.

Figure 4:
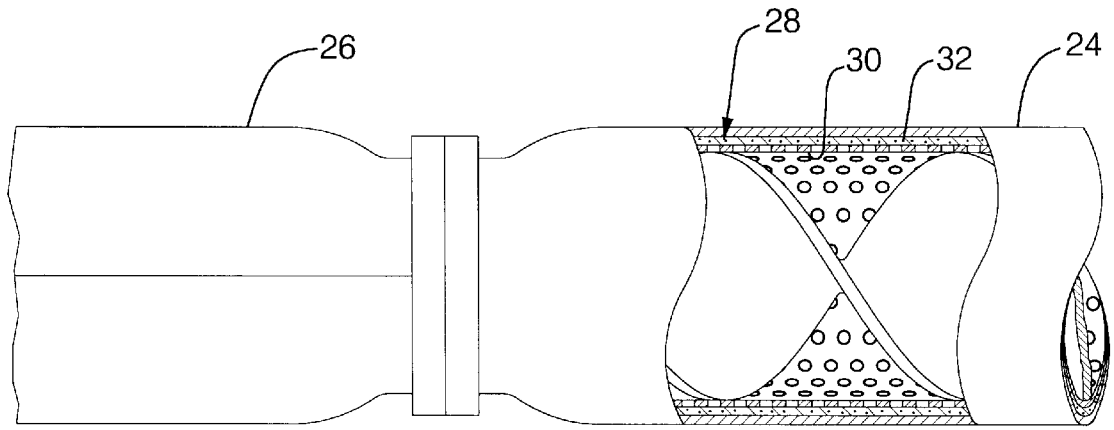
FIG. 4 is a side view of an example trap-converter assembly with portions broken away to show the trap interior.
Figure 5:
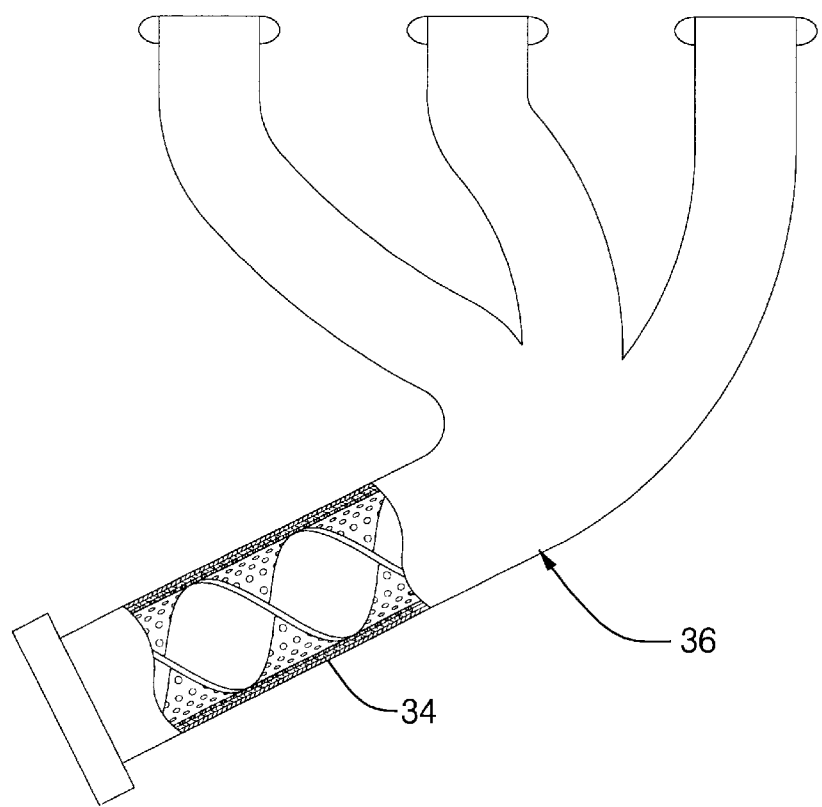
FIG. 5 is a side view of another assembly of another trap with an associated exhaust manifold.

FIG. 4 shows an alternative embodiment for an exhaust poison trap housing 24 mounted directly to the inlet of an associated catalytic converter 26. The housing 24 is internally similar to that described above except that porous means 28 are provided having the form of a perforate inner wall 30 spaced from the interior of the housing by a compressed wire mat 32 or other suitable porous material. FIG. 5 shows still another embodiment wherein an exhaust poison trap housing 34 is formed as part of an engine exhaust manifold 36. Many other arrangements for placing an exhaust poison trap in a vehicle exhaust system will be apparent to those familiar with engine exhaust systems.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. An exhaust poison trap for protection of catalytic converters in automotive exhaust systems, said trap comprising:

a tubular housing having open ends and a peripheral wall internally defining an exhaust chamber;

a helical wall longitudinally dividing the exhaust chamber into at least two longitudinally extending helical passages for exhaust gas flow; and porous means substantially covering the interior of said peripheral wall and forming an outer periphery of each of said helical passages;

whereby exhaust gas passing through said exhaust chamber is directed in a helical path through said helical passages, causing particulate matter in the gas to be accelerated outwardly and trapped in said porous means, thus protecting a downstream catalytic converter from trapped catalyst poisoning particles.

2. A poison trap as in claim 1 wherein said porous means includes a perforated wall closely spaced inwardly from said peripheral wall.

3. A poison trap as in claim 1 wherein said porous means includes a porous sheath mounted against said peripheral wall.

4. A poison trap as in claim 1 wherein said porous means includes a coating for aiding the trapping of poisons.

5. A poison trap as in claim 4 wherein said coating is catalytic for aiding the thermal reaction of gaseous exhaust products.

6. A poison trap as in claim 1 wherein the open ends of said housing include means for connection of the housing to an associated exhaust conduit.

7. A poison trap as in claim 1 wherein said housing is directly connected with an associated catalytic converter.

8. A poison trap as in claim 1 wherein said housing is directly connected with an engine exhaust manifold.

* * * * *